United States Patent Office 3,436,909
Patented Apr. 8, 1969

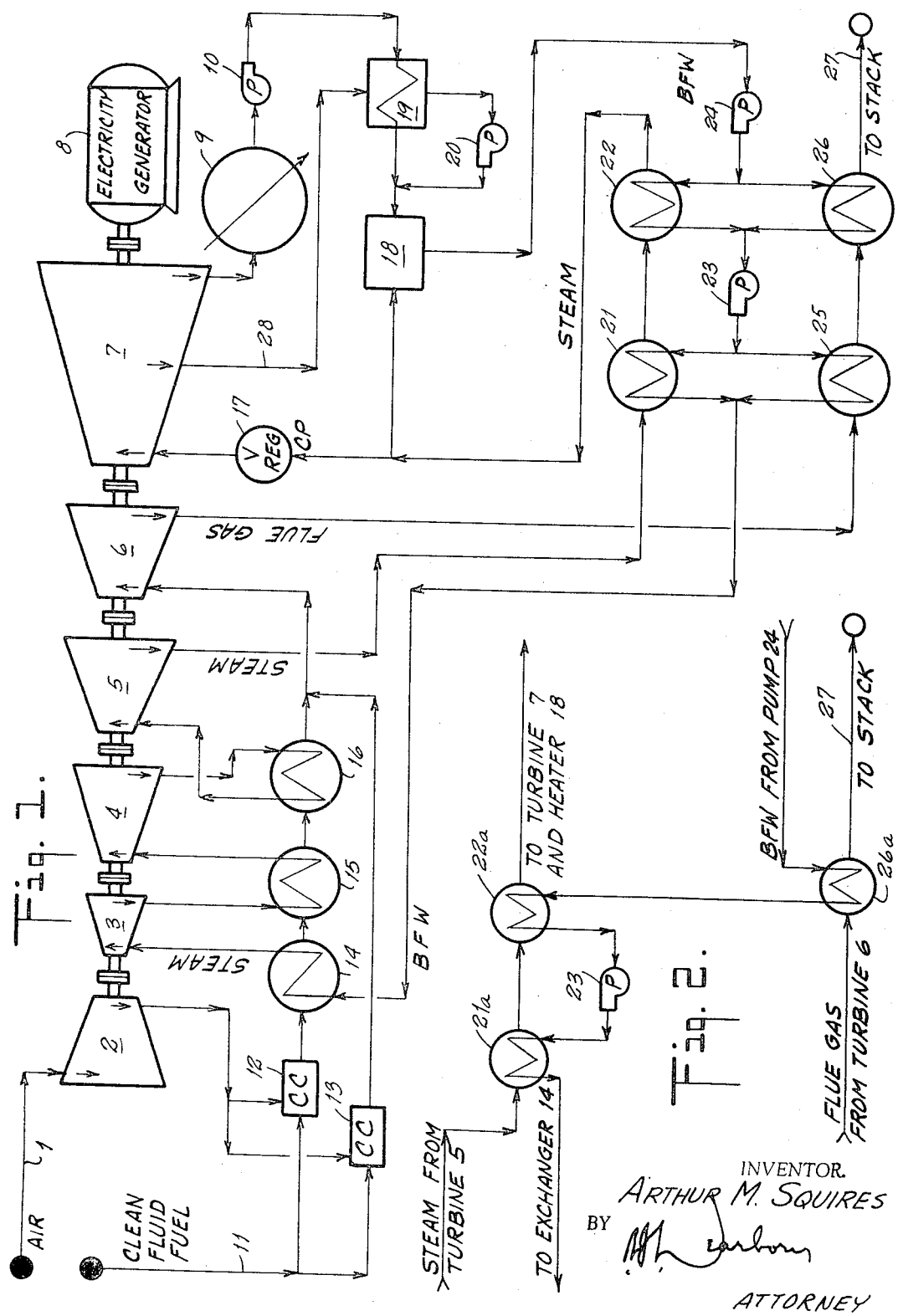

3,436,909
APPARATUS FOR COMBINED GAS-STEAM POWER CYCLE
Arthur M. Squires, 245 W. 104th St.,
New York, N.Y. 10025
Filed Jan. 4, 1967, Ser. No. 607,231
Int. Cl. F02c *3/20, 7/02;* F01k *25/00*
U.S. Cl. 60—39.18                              8 Claims

ABSTRACT OF THE DISCLOSURE

There is provided an improved Rankine steam power cycle peculiarly suited to the use of a clean fluid fuel, the combustion being conducted at high pressure and providing much more than the usual amount of reheat to the expanding steam, so that the steam exhausts from a high-temperature expansion in a highly superheated condition. Boiler feed water is heated by the cooling of both the exhausted steam and atmospheric-pressure combustion gases. The cooled steam is expanded in a low-temperature turbine exhausting to a condenser.

Summary of the invention

This invention pertains to the production of power from readily available fuels such as heavy fuel oil, coal, or natural gas.

An object of the invention is to provide a power cycle peculiarly adapted to the use of a clean fluid fuel, substantially free of sulfur and dust, so that effluents from the cycle are substantially free of objectionable atmospheric pollutants.

Another object of the invention is to provide a power cycle of such increased efficiency and unusual economy that it is economically attractive to provide ancillary plant in which "dirty" fuels, such as residual oil and coal, are converted into a clean fluid fuel for use in the new power cycle.

Another object is to provide a steam power cycle peculiarly adapted to the use of a so-called supercharged boiler for raising and superheating steam.

Another object is to provide a steam power cycle peculiarly suited for use of waste heat present in flue gases emerging from a gas-turbine power plant or from a magneto-hydrodynamic electricity generator.

Another object is to provide a power cycle well suited for use of nuclear heat to raise steam for the cycle, together with use of fossil fuels to provide superheat.

Something like 80 percent of electricity used in the United States is generated by means of a Rankine steam cycle of the following general characteristics: Liquid water is pumped to a high pressure. Heat is added by indirect heat exchange from hot flue gases at atmospheric pressure to raise and to superheat steam. Steam is expanded to a highly subatmospheric pressure in a turbine which exhausts to a condenser. Often there is a reheat at an intermediate pressure, rarely there are two reheats. Steam is extracted from the turbine at a series of intermediate pressures — often six or more — for use in the regenerative heating of boiler feed water; i.e., heat is supplied to the water primarily in form of the latent heat of condensation of the extracted steam. Regenerative heating often carries the temperature of boiler feed water to the neighborhood of 500° F. before any heat is added to the water from the hot flue gases. Heat is recovered from flue gases at low temperature in a heat exchange with combustion air.

The power industry has been diligent in developing and adopting innovations which have brought about a steady improvement in the economy of power generation by the conventional Rankine steam cycle just described. However, power engineers today are in general agreement that the technology of this cycle is in a highly mature state, and further improvements are not to be expected unless there is a drastic reduction in cost of alloy steels capable of withstanding temperatures above about 1050° F., or unless new steels are developed which can withstand a temperature above about 1200° F. while exposed to flue gases containing ash constituents deriving from the combustion of residual oils and coals.

A major disadvantage of present-day fossil-fuel power technology is the discharge of atmospheric pollutants from plants burning oils and coals. The public is rapidly becoming less tolerant of these pollutants, and the past year has seen an astonishing increase in orders placed for nuclear power generating equipment, an increase commonly said to result from a lack of an economically attractive technique for producing electricity from oil and coal without the discharge of pollutants.

An old idea is to convert oil or coal into a clean fuel gas and to burn the gas in a supercharged steam boiler — see, for example, TVF: Teknisk-Vetenskaplig Forskning, vol. 32 (1961), pp. 19–26. As an offset against the oil or coal conversion costs, the combination of the conventional Rankine steam cycle with a gas-turbine cycle which incorporates a supercharged boiler can afford savings both in capital and in operating costs. Far less heat-exchange surface is needed, and there is a sharp reduction in boiler cost. Gorzegno and Zoschak (Mechanical Engineering, vol. 87, No. 6 (June 1965), pp. 27–31) estimate the surface at one-third and the cost at one-half, for a supercharged boiler at 8 atmospheres. There is general agreement that the combination costs a little less to build than ordinary plant, and affords a reduction in fuel consumption on the order of 5 percent with use of present-day steam temperatures.

Higher steam temperatures become attractive, however, if heat is transferred to the steam from clean flue gases at high pressure — see, for example, U.S. Patent 3,002,347 (October 1961). The aforementioned reduction in heat-transfer surface makes it economical, while the cleanliness of the gas makes it feasible, to specify the use of expensive alloy steels which permit a steam temperature of 1200° F. or higher — a practical impossibility with presently available steels when dirty flue gas is provided.

A problem arises when the conventional Rankine steam cycle is combined with a gas-turbine cycle incorporating a supercharged boiler. Air to the gas-turbine cycle is heated by the work done to compress the air to a high pressure. Hence, cold amtospheric air is not available for heat exchange with flue gases which exhaust from the gas turbine. If all boiler feed water is heated regeneratively against extraction steam to a temperature in the neighborhood of 500° F., there is no use for heat in the flue gases at temperatures below this level. If flue gases are exhausted to the atmosphere at this level, the loss of plant efficiency is significant. Accordingly, prior proposals for the supercharged-boiler combined cycle have often reduced the degree to which boiler feed water is heated regeneratively, so that boiler feed water may receive heat from flue gases at temperatures below 500° F. The steam cycle is thereby said to be degraded. Considerable effort has been expended on finding optimum arrangements for combining regenerative boiler feed water heating with the recovery of heat from flue gases—see, for example, American Power Conference, vol. 24 (1962), pp. 350–370. On the other hand, some proposals have omitted heat recovery from flue gases exhausted from the gas turbine. A low stack temperature is achieved by reducing the temperature of gases entering the gas turbine to a degree such that the gas-turbine cycle produces no net power—see, for example, American Society of Mechanical Engineers Paper No. 66—GT/CMC–63 (1966).

I have therefore been surprised to discover that a modification of the Rankine steam cycle, in which regenerative heating of boiler feed water is eliminated altogether except at the lowest temperature levels, is far superior to the conventional Rankine steam cycle for purpose of combination with a gas-turbine cycle incorporating a supercharged steam boiler. The modification has not hitherto been considered for use in this combination.

It was recognized early in this century that a higher steam cycle efficiency can be obtained if steam is reheated a number of times during its expansion, the total amount of heat added to the steam in the several reheats being such that the steam emerges from the expansion in a highly superheated condition. German Patent 188,644 (September 1907) and U.S. Patent 892,818 (July 1908) incorporated proposals along these lines, in which the superheated exhaust steam was to be cooled against boiler feed water prior to the steam's being condensed in a condenser. The early proposals were improved upon by British Patent 234,497 (1926), which recognized that a turbine to exhaust highly superheated steam at a highly subatmospheric pressure would be impracticably large. Moreover, an exchanger to recover heat from steam at a highly subatmospheric pressure would be expensive. The British patent suggested that the steam be discharged from a high-temperature turbine at an unspecified intermediate pressure, that the steam be cooled by heat exchange against boiler feed water at this pressure, and that the cooled steam be expanded in a low-temperature turbine to a condenser. The steam was to be discharged from the high-temperature turbine at a temperature corresponding approximately to the boiling temperature of the live steam in the boiler, and the steam was to be cooled to the saturation temperature.

I have found that this modification of the Rankine cycle, not put into commercial practice so far as I am aware, is peculiarly advantageous in combination with a gas-turbine cycle, since it is generally disadvantageous to withdraw steam from the high-temperature turbine for use in the regenerative heating of boiler feed water. Accordingly, this steam cycle provides boiler feed water at a relatively cold temperature, which can take up heat from atmospheric-pressure flue gases at low temperature levels. Notice that this is true, surprisingly, in spite of the fact that cold boiler feed water is also employed to take up sensible heat from steam at similarly low temperatures. The ability to employ the cold boiler feed water to take up heat from both the superheated exhaust steam and the atmospheric-pressure flue gases can be understood when it is remembered that the specific heat of water is appreciably greater than the specific heat of steam.

As noted earlier, when a supercharged boiler is fired with a clean fluid fuel, there is an incentive to use a higher steam temperature than is ordinarily practicable or economic. It has long been recognized that the conventional Rankine steam cycle suffers a progressive deterioration in efficiency, by comparison with the ideal theoretical Carnot cycle, as the temperature rises above the critical temperature of water, 705° F., because heat is added with a rapid acceleration of temperature. The modified steam cycle has the advantage that more than the usual amount of heat is added to the cycle fluid at temperatures approaching the maximum temperature in the cycle, and accordingly is peculiarly advantageous in combination with a supercharged boiler fired with a clean fluid fuel. In this combination, the degrading of the steam cycle by virtue of intake of low-temperature heat from flue gases to the cold boiler feed water can be far more than offset by the "upgrading" brought about by intake of an unusually large amount of high-temperature heat. It will be appreciated that the intake of heat to boiler feed water from the cooling of the superheated exhaust steam does not degrade the cycle, since this heat is regenerative with respect to the sensible heat in this steam, just as conventional regenerative boiler feed water heating is regenerative with respect to the latent heat of extraction steam.

According to my invention, there is provided an improved Rankine steam cycle of the type in which heat is added to the steam at one or more intermediate pressures during its expansion from a high initial pressure to a low terminal pressure, at least a significant part of the heat being supplied by indirect heat transfer from gases produced by the combustion of a fuel with a gas containing oxygen, the improvement comprising: supplying the heat to the steam in an amount such that steam exhausted from the expansion is highly superheated, deriving the gas containing oxygen by steps which include the compression of a gas containing at least a major portion of the oxygen to a pressure of at least about 40 pounds per square inch absolute (p.s.i.a.), cooling the combustion gases by heat exchange to boiler feed water, cooling the exhausted steam by heat exchange to boiler feed water, and expanding at least a major part of the cooled steam in a turbine exhausting at highly sub-atmospheric pressure to a condenser.

The gases are advantageously generated by combustion of a fuel with air compressed to a pressure of at least about 40 p.s.i.a., preferably higher than about 60 p.s.i.a., the gases giving up heat to steam while remaining at high pressure, then being expanded in a turbine, and finally being cooled against the cold boiler feed water which the invention provides This arrangement is especially suited to the utilization of a clean fluid fuel, such as natural gas. If only dirty fuels are available, such as residual fuel oils or coals, a clean fluid fuel may advantageously be produced from such dirty fuels in ancillary plant using known processes —e.g., a combination of a step such as carbonization, gasification, or cracking, to produce a fluid fuel, and steps which remove dust and sulfur from the fluid fuel. See a discussion of such processes in my U.S. Patent 3,276,203 (October 1966). I believe that economic circumstances are commonly such that the sale of elemental sulfur derived from the aforementioned ancillary plant, together with the savings of fuel brought about by use of the more efficient power cycle of this invention, will more than pay the cost of producing a clean fluid fuel for use with the cycle. Wherever such circumstances exist, "clean power" can be cheaper than the "dirty power" generated by the present-day technology.

There is an efficiency advantage in exhausting steam from the high-temperature turbine at as low a pressure as possible, but the plant cost becomes greater when lower pressures are used, for two reasons: the final stages of the high-temperature turbine must be larger and hence more costly, and the exchanger in which the exhausted steam is cooled against boiler feed water requires more surface if the relative drop in pressure of the steam while passing through this exchanger is to remain at a constant value. I believe that it is not advantageous to specify an exhaust pressure below about one-half the pressure in the prevailing atmosphere, and I believe that the preferred pressure, in the more usual circumstances of fuel costs and charges for the use of capital, is a pressure in the neighborhood of atmospheric. However, a reduction in capital cost can be brought about by using a pressure higher than atmospheric, and in some cost circumstances—or when a plant is required for operation at a low load factor and the capital cost should be held as small as possible—an appreciably super-atmospheric pressure may be preferred. I believe that a pressure higher than about 100 p.s.i.a. is not advantageous under most economic circumstances likely to be encountered.

The initial steam pressure is advantageously higher than about 2000 p.s.i.a. At least two reheats to a temperature of at least 1200° F. are preferred, and are easily and economically attainable if a clean fluid fuel is burned in a supercharged boiler.

Viewed broadly, the cycle of this invention is advantageously used in conjunction with any power system in which air, or another oxygen-containing gas, is supplied to a combustion which is conducted at a high pressure. A gas-turbine cycle incorporating a supercharged boiler, already discussed, is one example of such a power system. Other examples are: a gas-turbine plant which exhausts gases containing oxygen to a cumbustion taking place in an atmospheric-pressure boiler, and a magnetohydrodynamic electricity generator in which a fuel is burned with air—or, preferably, in which a clean fluid fuel is burned with oxygen or air enriched with oxygen, in accordance with the teachings of my copending application Ser. No. 582,883, filed Sept. 29, 1966, now U.S. Patent 3,324,654 (June 13, 1967).

Steam may advantageously be raised for the cycle of this invention from heat supplied by a nuclear reactor. Nuclear reactors are best adapted to supplying the relatively low-temperature heat needed to boil water. If a nuclear reactor is used to raise steam, and if a fossil fuel is used to superheat steam for the cycle of this invention, the efficiency of conversion of the energy in the fossil fuel to electricity is outstandingly high.

At low boiler feed water temperatures, it is advantageous to practice regenerative heating in the usual fashion, using a bleed of steam extracted ahead of the low-temperature turbine as well as one or more bleeds of steam from within this turbine. After the indirect cooling of the main flow of steam, and ahead of the low-temperature turbine, it may sometimes be advantageous to further cool the superheated steam to the saturation temperature by direct contact of all of the steam with the boiler feed water.

If a relatively low pressure is specified at the outlet of the high-temperature turbine, the advantage generally lies in providing heat to boiler feed water at the lowest temperatures only by means of regenerative heating—i.e., so that the boiler feed water will enter the heat exchange with flue gases at substantially the saturation temperature corresponding to the aforesaid pressure. If a relatively high pressure is specified, however, there may sometimes be an advantage in providing for heat exchange between flue gases and a portion of the boiler feed water, this heat exchange acting in parallel with the train of regenerative heaters.

Highest efficiency is obtained if the indirect cooling of steam is carried to a temperature fairly close to the saturation temperature at the prevailing pressure, so that exhaust from the low-temperature turbine is wet. I believe that a cheaper plant will result, however, if the indirect cooling of steam is restricted, leading to a drier exhaust; and this arrangement may sometimes be preferred.

*Brief description of the drawings*

FIG. 1 is a flow diagram which illustrates one embodiment of my invention; and

FIG. 2 is a flow diagram which illustrates an alternative arrangement of the heat exchangers in which heat is recovered from superheated steam and from flue gases.

*Description of the preferred embodiments*

Reference may now be had to FIG. 1, which presents diagrammatically a preferred embodiment of my invention and provides both an understanding of the working of the apparatus indicated therein and also a numerical example, using methane as fuel, the methane being available at a pressure higher than about 120 p.s.i.a.

Air enters the plant represented by FIG. 1 via line 1 from the atmosphere, which is at 14.17 p.s.i.a. and 80° F. The air is compressed in compresor 2 to about 120.4 p.s.i.a., the rate of air flow being 2,781,030 pounds per hour (lbs./hr.). Methane is introduced via line 11 at a rate of 154,002.5 lbs./hr. A major part of the compressed air and a major part of the methane are burned in combustion-chamber 12, depicted as a rectangle containing the letters "CC," to form flue gases which are cooled (against water and steam) in heat-exchangers 14, 15, and 16. The cooled gases arejoined by flue gases from combustion-chamber 13, in which minor parts of the compressed air and methane are burned, these minor parts being regulated (by valve-means not shown in FIG. 1) to control the temperature of the combined gases from heat-exchanger 16 and combustion-chamber 13 at 1500° F. The combined gases enter expansion turbine 6 at a pressure of about 114.4 p.s.i.a., and discharge from turbine 6 at about 15 p.s.i.a. and about 847° F. The gases are then cooled (against water) in heat-exchangers 25 and 26, and are discharged at a temperature of about 280° F via line 27 and via a stack (not shown in FIG. 1) to the atmosphere.

Boiler feed water (BFW) at about 206.8° F., flowing at a rate of 1,801,600 lbs./hr., is pumped from about 13.25 p.s.i.a. to about 700 p.s.i.a. in pump 24, and the water is heated in heat-exchangers 22 and 26 (against steam and flue gases respectively) to a temperature between about 400° and 450° F. The BFW is then pumped to about 3,000 p.s.i.a. in pump 23, and is further heated in heat-exchangers 21 and 25 (against steam and flue gases respectively). The heated water is sent to heat-exchanger 14, where it is boiled and the resulting steam is superheated (against flue gases at about 120 p.s.i.a.). Steam is delivered from heat-exhcanger 14 to the inlet of expansion turbine 3 at 2,400 p.s.i.a. and 1200° F., and is expanded in turbine 3 to about 474 p.s.i.a. Steam from turbine 3 is reheated to 1200° F in heat-exchanger 15 (against flue gases) and is delivered to turbine 4 at about 427 p.s.i.a. and 1200° F. The steam is expanded in turbine 4 to about 84.3 p.s.i.a., and is again reheated to 1200° F. in heat-exchanger 16 (against flue gases). The steam from heat-exchanger 16 enters turbine 5 at about 75.9 p.s.i.a. and is expanded in this turbine to about 15 p.s.i.a., leaving the turbine at about 767° F. I believe that best practice of the invention is provided when a temperature at least in the order of about 600° F. is obtained in the highly superheated steam issuing from the high-temperature expansion, terminating in turbine 5 of FIG. 1. The low-pressure steam from turbine 5 is cooled in heat-exchangers 21 and 22 (against BFW) to about 260° F. A minor portion of the steam, viz., 89,170 lbs./hr., is sent at 260° F. from heat-exchanger 22 to BFW heater 18, where this steam is condensed, supplying heat to raise the temperature of BFW. Heater 18 is of the open-contact type. The remaining major portion of the steam, at a pressure of about 14.4 p.s.i.a., flows through optional regulating valve 17 and into low-temperature, low-pressure turbine 7. The operation of regulating valve 17 will be discussed presently. The steam expands in turbine 7 to 0.9492 p.s.i.a., leaving the turbine at 100° F. in a wet condition. A second minor portion of the steam, viz., 91.272 lbs./hr., is extracted from turbine 7 at a pressure of about 5.15 p.s.i.a., through line 28, and is delivered to BFW heater 19 at about 4.74 p.s.i.a., where this steam is condensed, supplying heat to raise the temperature of BFW. Heater 19 is of the indirect or closed type. Steam from turbine 7 is condensed in condenser 9, by heat-exchange against atmospheric cooling water or atmospheric air, and the condensate is pumped in pump 10 to a pressure of about 20 p.s.i.a. The pumped boiler feed water is heated in heater 19 to about 155° F. The drain of condensate from heater 19, at about 160° F., is pumped in pump 20, and the discharge from pump 20 is combined with the main flow of BFW from heater 19. The combined flows are heated in heater 18 to about 206.8° F., and the drain from heater 18 is furnished to pump 24.

Turbines 3, 4, 5, 6, and 7 furnish power to drive air compressor 2 and and electricity generator 8. The respective turbines, the compressor, and the generator are depicted in FIG. 1 as being linked via a common shaft. Often there is advantage in operating some of this equipment at one speed and some at another, or in driving the air compressor by means of its own separate driving turbine. Turbines 5 and 7, at the flow rates used in this example, are advantageously built in the form of several separate turbines acting in parallel, and some designers will probably prefer to build compressor 2 in two machines. It will therefore be appreciated that the arrangement depicted in FIG. 1 is highly schematic.

This example, under typical conditions of atmospheric cooling water availability, generator mechanical efficiency, and need for auxiliary power within the power station, can send out electricity at a rate of about 451,945 kilowatts. At this rate, the fuel requirement per kilowatt-hour of electricity sent out—the "heat rate"—is 8,131.8 British thermal units per kilowatt-hour (B.t.u./kwh.), reckoned on the higher heating value basis. A conventional plant using present-day technology (burning methane at atmospheric pressure, supplying steam to a turbine at 2,400 p.s.i.a. and 1000° F., employing one reheat to 1000° F., and exhausting at 100° F.) would provide a heat rate not less than about 9,450 B.t.u./kwh., and would require a flow of steam not less than about 65 percent greater than the steam flow of the foregoing example of the invention. The outstanding advantage of the invention is apparent.

In this example, the pressure of the steam entering turbine 7 at the design steam flow is about 14.4 p.s.i.a., a little above the 14.17 p.s.i.a. prevaiilng in the atmosphere There is an advantage in providing regulating valve 17 in this example, the valve being governed to maintain a constant pressure of about 14.4 p.s.i.a. at a point immediately upstream of the valve. As demand for electricity falls and as the steam flow becomes smaller, valve 17 will close and the pressure of the steam within heat-exchangers 21 and 22 will be maintained substantially constant. If this control means were not provided, the pressure of steam passing through exchangers 21 and 22 would fall to subatmospheric pressures when demand for electricity declines. Such a fall in pressure would necessitate the use of heavier and more expensive vessels to house these exchangers.

There is some gain in plant efficiency if one designs for a subatmospheric pressure at the inlet of turbine 7, but I believe the overall economic advantage is usually otherwise. A design pressure at the exit of turbines below about one-half that prevailing in the atmosphere is not recommended, although if a subatmospheric design pressure is used, there is no particular objection to the pressure's falling below one-half atmoshperic when the plant operates at reduced output.

I believe that there is a saving in plant capital cost, at the expense of a decline in plant efficiency, if a pressure appreciably higher than atmospheric is specified at the outlet of turbine 5. This turbine is thereby made less costly, and less heat-transfer surface is needed for exchangers 21 and 22. (These remarks need to be qualified by pointing out that a relatively small increase in the pressure at the outlet of turbine 5 may cause a drastic increase in the cost to house exchangers 21 and 22 without a corresponding reduction in other costs.) An example in which the pressure at the discharge of turbine 5 was 22.5 p.s.i.a. afforded a heat rate of 8,166.1 p.s.i.a., and may be found economically preferable to the foregoing example if fuel is cheap and capital is dear. The flue gas left the 22.5 p.s.i.a. example at 300° F., steam entered turbine 7 at 280° F., the extraction to heater 19 was made at about 6.66 p.s.i.a., and BFW left heater 18 at about 227.6° F.

As a higher pressure is specified for the discharge of turbine 5, the need to provide regulating valve 17 is less, and it sometimes becomes advantageous simply to allow the pressure of steam in exchangers 21 and 22 to move up and down with the pressure of steam entering turbine 7, as variations in steam flow occur.

It may sometimes be advantageous to pass all of the steam from exchanger 22 into open-contact heater 18, which is then provided with an outlet for steam as well as for boiler feed water. In this way, the steam may be cooled substantially to its saturation temperature before it is committed to turbine 7.

Alternatively, heater 18 may be omitted, and steam may be cooled substantially to its saturation temperature in exchanger 22. In this alternative, heater 19 may advantageously be of the open-contact type.

If desired, methane entering via line 11 may advantageously be heated by heat exchange against a portion of the flue gas from turbine 6.

FIG. 2 illustrates diagrammatically an alternative arrangement of heat exchangers for the cooling of steam from turbine 5 and flue gas from turbine 6. The arrangement is advantageous in economic circumstances where fuel is cheap and capital is dear. In these circumstances, I believe there is an advantage in allowing steam to enter turbine 7 at a higher temperature, so that the steam leaves this turbine containing less moisture or even containing no moisture at all. When this is done, there is advantage in first heating BFW from pump 24 in heat-exchanger 26a against flue gases, and then in exchangers 22a and 21a against steam, which may advantageously be cooled only to about 500° F. in these exchangers in a plant in which steam enters turbine 5 at about 75.9 p.s.i.a. and leaves at about 15 p.s.i.a.—under these conditions, the exhaust from turbine 7 is dry. The temperature differences across the heat-transfer surfaces of exchangers 21a, 22a, and 26a of FIG. 2 are greater, and less total surface is required, than is the case for exchangers 21, 22, 25, and 26 under the conditions of the example described in the foregoing discussion of FIG. 1. The heat rate is poorer—about 8,300 B.t.u./kwh. sent out—but sometimes the saving in exchanger first cost will offset the increased outlay for fuel.

Other clean gaseous or liquid fuels besides methane may be used, and there is particular advantage in using a clean fluid fuel such as may be derived from residual oils or coals by means of gasification, cracking, carbonization, hydrocracking, hydrogasification, and hydrocarbonization processes and by sulfur- and dust-removal processes. Waste heat thrown off from these several processes may often be advantageously used to heat BFW, to raise steam, and sometimes even to superheat steam, thereby reducing the duties of the exchangers in FIGS. 1 and 2 which are provided for these respective purposes—perhaps eliminating need for some of these exchangers altogether.

Nuclear heat may advantageously be substituted for a low-temperature portion of the heat supplied to water by exchanger 14.

Exchangers 14, 15, and 16 may be replaced by equivalent exchangers receiving heat from flue gases at about atmospheric pressure, the gases being derived from a magnetohydrodynamic electricity generator or from a combustion to which combustion oxygen is supplied in form of the effluent from a gas turbine. The atmospheric-pressure flue gases would pass from the exchanger substituted for exchanger 16 to exchanger 25 of FIG. 1 (or to exchanger 26a of FIG. 2), turbine 6 being omitted.

I do not wish my invention to be limited to the particular embodiments described. Higher steam pressures and temperatures will be found advantageous; a design using steam at 3,500 p.s.i.a. and 1200° F. to turbine 3, with a reheat to 1300° F. before turbine 4, and a reheat to 1400° F. before turbine 5, will give an outstandingly good efficiency.

I intend the expression "indirect heat transfer from gases," which appears in some of the appended claims, to embrace the transfer of heat from hot combustion gases to steam via a heat carrier, such as a molten metal, employed for example in steam power plants described in U.S. Patent 2,902,830 (September 1959).

Those skilled in the art will recognize other arrangements and other applications of the invention which will differ from my examples only in detail, not in spirit.

I claim:

1. In apparatus for generating power of the type which includes a pump to pressurize boiler feed water, a generator of steam at high pressure, a series of expansion turbine stages for expanding said steam ot a terminal pressure and developing power, substantially all of the exhaust from each given nonterminal stage constituting the flow entering the next stage of said series, combustion means for burning a fuel with a gas containing oxygen to produce combustion products, and means for adding heat to said steam at one or more pressures intermediate between said high pressure and said terminal pressure, said means including one or more heat exchangers each for cooling said combustion products and for heating the exhaust from a stage of said series, the improvement comprising:
  (a) one or more heat exchangers for cooling the exhaust from the terminal stage of said series and for heating boiler feed water,
  (b) an expansion turbine to receive at least a major portion of said cooled exhaust, developing power and expanding steam to a highly subatmospheric pressure,
  (c) a condenser to receive the exhaust from said expansion turbine,
  (d) a gas compressor suitable to provide a discharge at a pressure of at least about 40 p.s.i.a.,
  (e) means for conducting at least a major portion of said gas to the inlet of said gas compressor,
  (f) means for utilizing said discharge to support combustion, said means including said combustion means for burning said fuel with said gas containing oxygen, and
  (g) one or more heat exchangers for further cooling said combustion products and for heating boiler feed water.

2. Apparatus of claim 1 in which also said combustion products are at a pressure of at least about 40 p.s.i.a. in said one or more heat exchangers each for heating the exhaust from a stage of said series.

3. Apparatus of claim 2 in which also said gas containing oxygen is atmospheric air.

4. Apparatus of claim 1 including means for regulating said terminal pressure at a level close to the pressure prevailing in the surrounding atmosphere.

5. Apparatus of claim 1 including means for regulating said terminal pressure at a level greater than about one-half the pressure in the surrounding atmosphere.

6. Apparatus of claim 1 including means for regulating said terminal pressure at a level below about 100 p.s.i.a.

7. Apparatus of claim 1 in which also said fuel is a fluid fuel substantially free of sulfur and particulate matter.

8. In apparatus for generating power of the type which includes a pump to pressurize boiler feed water, a generator of steam at high pressure, a series of expansion turbine stages for expanding said steam to a terminal pressure and developing power, substantially all of the exhaust from each given nonterminal stage constituting the flow entering the next stage of said series, combustion means for burning a fuel with air to produce combustion products, and means for adding heat to said steam at one or more pressures intermediate between said high pressure and said terminal pressure, said means including one or more heat exchangers each for cooling said combustion products and for heating the exhaust from a stage of said series, the improvement comprising:
  (a) one or more heat exchangers for cooling the exhaust from the terminal stage of said series and for heating boiler feed water,
  (b) an expansion turbine to receive at least a major portion of said cooled exhaust, developing power and expanding steam to a highly subatmospheric pressure,
  (c) a condenser to receive the exhaust from said expansion turbine,
  (d) a gas compressor suitable to provide a discharge at a pressure of at least about 40 p.s.i.a.,
  (e) means for conducting air to the inlet of said gas compressor,
  (f) means for conducting said discharge to said combustion means,
  (g) an expansion turbine for expanding said combustion products and developing power, and
  (h) one or more heat exchangers for further cooling said combustion products and for heating boiler feed water.

References Cited

UNITED STATES PATENTS

| 2,968,156 | 1/1961 | Pacault et al. | 60—73 |
| 3,069,342 | 12/1962 | Flatt | 60—29.18 XR |
| 3,164,958 | 1/1965 | Pacault. | |
| 3,325,992 | 6/1967 | Sheldon. | |

FOREIGN PATENTS 944,630  12/1963  Great Britain.

JULIUS E. WEST, Primary Examiner.

U.S. Cl. X.R.

60—49, 73